United States Patent [19]

Johnsen et al.

[11] Patent Number: 5,379,699
[45] Date of Patent: Jan. 10, 1995

[54] ACTIVE SPRAY ROCKET PROPELLANT IGNITION CONTROLLER

[75] Inventors: Paul T. Johnsen, Ridgecrest; Alfred O. Smith, China Lake; Robert B. Dillinger, Ridgecrest, all of Calif.

[73] Assignee: The United States of America as represented by the Secretary of the Navy, Washington, D.C.

[21] Appl. No.: 104,954

[22] Filed: Aug. 2, 1993

[51] Int. Cl.⁶ ............................................. C06B 45/00
[52] U.S. Cl. ..................... 102/290; 102/287; 102/289; 102/291
[58] Field of Search ................. 102/287, 289, 290, 291

[56] References Cited

U.S. PATENT DOCUMENTS

| | | | |
|---|---|---|---|
| 3,991,565 | 11/1976 | Gordon et al. | 60/255 |
| 4,642,983 | 2/1987 | Melvin et al. | 60/219 |
| 4,882,994 | 11/1989 | Veltman et al. | 102/290 |
| 4,915,883 | 4/1990 | Morgan | 264/3.4 |
| 5,042,385 | 8/1991 | Reed, Jr. et al. | 102/290 |
| 5,085,725 | 2/1992 | Sayles | 156/281 |

*Primary Examiner*—Peter A. Nelson
*Attorney, Agent, or Firm*—Melvin J. Sliwka; John L. Forrest, Jr.

[57] ABSTRACT

An igniter for solid fuel rockets in which hot gases from an initiator are channeled to drive a piston against a reservoir of combustion modifying fluid, like ethylene glycol, so as to spray the fluid onto the propellant grain just before ignition. After the piston moves, the hot gases escape the igniter as to ignite the propellant directly or through an intermediate main ignition charge.

7 Claims, 1 Drawing Sheet

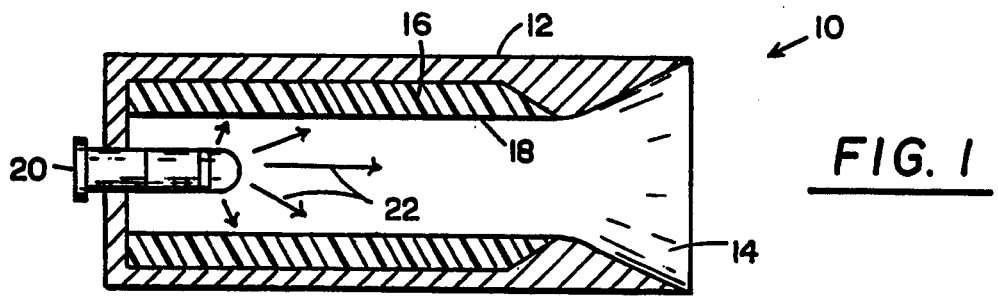
FIG. 1
FIG. 2
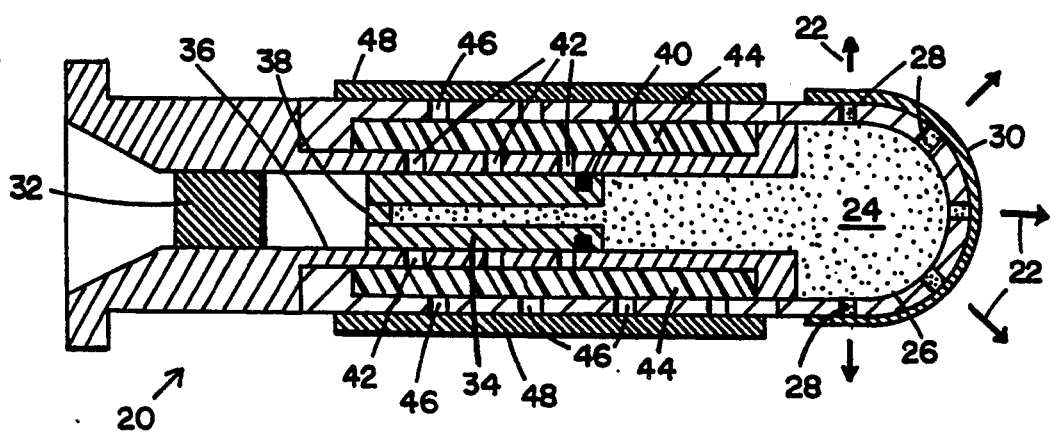
FIG. 3

ACTIVE SPRAY ROCKET PROPELLANT IGNITION CONTROLLER

TECHNICAL FIELD

This invention concerns controlling the rate at which combustion is established over the burning surface of a solid fuel rocket propellant grain. More particularly, an igniter is disclosed that disperses either ignition inhibiting or ignition enhancing fluids onto the propellant immediately prior to actually igniting the propellant.

BACKGROUND OF THE INVENTION

Rocket designers select a type, density, and shape propellant grain to achieve the needed thrust, duration, and burn characteristics desired for a given performance profile. Often, the best grain selection can yield a rocket motor that has natural ignition characteristics different from those the designer would prefer, considering other requirements such as the needs of the launcher system. Thus, it is desirable to be able to tailor the ignition of a propellant grain so as to produce modified start up characteristics.

For example, in a vertical launch system on board ships, several rockets may share an exhaust plenum and diverter that could be damaged by the sudden blast from a quick ignition of a rocket. In this case, the propellant grain sometimes is coated with an inhibitor to slow down propagation of the flame spread and avoid sudden pressure rises. On the other hand, a design goal that emphasizes fast response may require a coating on the propellant that enhances and accelerates ignition.

Other ignition characterizing systems usually paint some material on the surface of the propellant grain to inhibit ignition. But these systems have numerous difficulties. Painting is labor intensive and quality control is hard to maintain. Also, the chemical composition of the grain may be affected, especially during long term storage, as various constituents of the propellant react with or migrate into the inhibitor. Conversely, the coating may introduce contaminants that migrate into the grain and alter its behavior. Since grains are typically hollow, having a small diameter burning surface inside, they are hard to inspect for coating quality or for long term degradation. Similar problems are encountered with ignition enhancing coatings.

SUMMARY OF THE INVENTION

Briefly, a new and novel igniter is described in which expanding hot gases from the initiator move a piston against a storage chamber filled with an ignition controlling fluid. The fluid is forced out of the chamber into the rocket motor and onto the surface of the propellant grain. The fluid coats the propellant and inhibits or enhances burning as desired. After movement of the piston, the hot gas from the initiator is vented to a main ignition charge so as to ignite the charge. Burning gases from the main ignition charge are then vented onto the surface of the propellant so as to ignite the grain.

Many advantages flow from this approach. No coatings are in contact with the propellant until the moment of ignition. Thus, any migration of foreign material into the grain, which might degrade the physical properties of the propellant, is prevented. Likewise, the absence of a permanent coating insures against the migration of essential propellant constituents into the coating, which could result in erratic burning characteristics or loss of physical properties. Another advantage is that types of fluids may be used that, if incorporated into permanent coatings, would ruin the propellant grain. The cost, labor, and quality control problems of applying and inspecting permanent coatings are completely obviated. Hence, the propellant grain is more stable and lower in cost to produce. Since the fluid is actively applied at the moment of ignition, it is even possible to control the ignition in a much more elaborate fashion. For example, dual fluids could be sprayed onto the grain, first an inhibitor, and later a combustion accelerator. Such a controlled burning profile could never be accomplished with a permanent coating.

Many other advantages and features are described in the drawings and detailed description that follows.

BRIEF DESCRIPTION OF THE DRAWING

FIG. 1 is a sectional view of a schematically simplified rocket motor with the combustion controlling igniter of the present invention disposed therein to show how combustion controlling fluid is dispersed throughout the propellant grain.

FIG. 2 shows the igniter itself in a simplified and sectional view.

FIG. 3 is a graph comparing start up combustion characteristics of a rocket using the igniter of the instant invention with various fluids.

DETAILED DESCRIPTION OF THE INVENTION

A rocket motor 10 is schematically shown in section in FIG. 1. A generally cylindrical casing 12, with a nozzle 14, contains a cylindrical propellant grain 16. Grain 16 typically burns on the interior surface 18. The combustion controlling igniter 20 of the present invention is mounted at a suitable location in casing 12 so as to be in communication with the burning surface 18. At the moment of ignition, combustion modifying fluids are sprayed onto the surface 18 of the grain as suggested by arrows 22.

FIG. 2 shows igniter 20 in greater detail, but still schematically. Igniter 20 comprises a generally cylindrical structure with the various parts concentrically engaged, but this arrangement is exemplary only. Combustion modifying fluid 24 is contained within a chamber 26. Chamber 26 has a plurality of exit ports 28 arrayed about its surface. Ports 28 are sealed with a sealing layer 30 of any suitable material. Aluminum foil, secured to chamber 26 and over ports 28 with epoxy type adhesive has been successfully used in the preferred embodiment for sealing layer 30.

Igniter 20 is adapted to receive a standard initiator, well known to those skilled in the art, at the left end in FIG. 2. However, for simplicity in the drawing, the initiator is shown only schematically as an initiator 32. A piston 34 is adapted to slide within a tube 36 against the fluid 24 in chamber 26. Piston 34 is closed with a plug 38 and provided with an O-ring 40 so as to sealingly engage tube 36. Upon ignition, initiator 32 is ignited producing hot gases that push piston 34 against fluid 24. Fluid 24 is forced out of chamber 26, breaking through sealing layer 30 and into the rocket motor as indicated with arrows 22 (FIG. 1). As piston 34 moves to the right in FIG. 2, a series of ports 42 are uncovered. Hot gas from burning initiator 32 passes through ports 42 and ignites a main ignition charge 44 which may comprise, for example, a layer of pyrotechnic material such as boron potassium nitrate. Main ignition charge 44 produces hot exhaust products that pass out through another series of ports 46, once again breaking through a sealing layer 48 disposed about the outer circumference of igniter 20. The exhaust from main ignition charge 44 start the combustion of propellant grain 16 immediately after grain 16 has been coated with fluid 24.

If desired, the main ignition charge 44 may be eliminated and the hot gases from initiator 32 vented directly to grain 16 through ports extending from tube 36 to sealing layer 48.

In operation, fluid 24 is not only sprayed onto grain 16 by the compressive force of piston 34, but also by the vented gases from the initiator 32 and the main ignition charge 44. A cloud of fluid 24 within grain 16 and around the igniter 20 is driven down the length of surface 18 by the expanding gases. In this way, the surface 18 is wetted with fluid an instant before being ignited by the hot gases from the igniter.

Fluid 24 may comprise ethylene glycol, light silicone oil, fire extinguishing materials like Halon 1011 or Halon 1211, carbon dioxide, or even just water, all of which suppress combustion. Fluid 24 may even comprise a flowable dry powdered combustion suppressing material. Halon 1211, when used with a main ignition charge 44 of a Magnesium-Teflon mixture, has been found to actually enhance flame spread as the hot particles of the charge 44 react with halogens in the Halon 1211 to speed up heat transfer to the grain 16.

The structural parts of igniter 20 and piston 34 may be made from stainless steel, high strength plastics, or any other suitable material. Chamber 26 may be divided with a breakable wall so as to store one type of fluid near the exit ports 28 and a second fluid near the piston. Upon ignition, the piston 34 would force first one fluid and then another out of ports 28. Adjusting the position of ports 42 and the length of tube 36 allows the timing of the ignition to be exactly controlled relative to the dispersion of fluids onto the grain. Accordingly, almost any combination of time sequenced applications of combustion modifying fluids and grain ignition can be generated as needed.

Experiment

Several test motors were fired using the igniter of the present invention. The results are shown in FIG. 3. The rise of pressure is a direct consequence of the rate of flame spread across the propellant surface 18. Thus, FIG. 3 graphs pressure as a function of time up to 0.08 seconds after ignition. Curve 50 shows the fast rise time of an uninhibited grain fired to establish a base of comparison. Curve 51 shows the modified slower combustion resulting when ethylene glycol is used as fluid 24 and main ignition charge 44 is boron potassium nitrate pellets. Curve 52 shows ethylene glycol inhibitor fluid with a main ignition charge of Magnesium-Teflon mixture.

Clearly, many combinations are possible and only a few preferred embodiments have been described herein. Numerous substitutions and alterations are permissible without departing from the spirit and scope of the invention as defined in the following claims.

What is claimed is:

1. A rocket propellant ignition controller for applying a combustion modifying substance to the propellant just prior to the ignition of the propellant comprising in combination:
   an igniter adapted to be mounted in communication with the burning surface of the rocket propellant;
   a sealed fluid containing chamber in said igniter containing a combustion modifying fluid;
   initiator means in said igniter adapted to generate hot pressurized gas upon ignition;
   means for transferring the force of said pressurized gas against the fluid in said chamber so as to force the fluid out of the chamber and onto the propellant; and
   means to valve said pressurized gas out of the igniter so as to begin combustion of the propellant immediately after the fluid is forced onto the propellant.

2. The controller of claim 1 including a passageway connecting said fluid containing chamber to said initiator means, and in which said means for transferring the force comprises a piston slidable within and along said passageway under the impetus from said pressurized gas.

3. The controller of claim 2 in which said means to valve gas comprises exit ports from said passageway in a location uncovered by the movement of said piston toward said fluid.

4. The controller of claim 3 including a main ignition charge in said igniter connected to said exit ports and adapted to be ignited by gas from said initiator means passing through said exit ports, the ignition of said main ignition charge, in turn, beginning combustion of the propellant.

5. A method of controlling the initial burning of a rocket propellant grain comprising the steps of:
   (A) igniting a pyrotechnic mixture initiator inside a closed igniter to generate confined hot gases:
   (B) directing said hot gases through a passageway and against a combustion modifying fluid so as to force said fluid onto the propellant grain; and
   (C) venting said hot gases so as to begin combustion of the grain after the grain is coated with said fluid.

6. A rocket propellant igniter adapted to spray combustion modifying fluid onto the propellant prior to ignition comprising in combination:
   a cylindrical inner housing having a first end adapted to receive an explosive initiator and a second end opposite from said first end adapted to fasten to a sealed chamber;
   a combustion modifying fluid in said chamber;
   a piston slidably disposed within said inner housing so as to be movable against the fluid in said chamber in response to expanding hot gases from the ignition of said initiator;
   sealed exit ports from said chamber adapted to break and allow the exit of fluid from said chamber in response to pressure in the fluid caused by the movement of said piston against said fluid, said exit ports sealed by a breakable membrane secured over the exit ports;
   hot gas ports through the wall of said inner housing in the region of the piston, which ports are uncovered by the movement of said piston against the fluid so as to vent hot gas from said inner housing;
   an outer housing surrounding said inner housing;
   a main ignition charge disposed between said inner and outer housings, in the area of said hot gas ports and operable to be ignited by vented hot gas from within said inner housing; and
   additional ports in said outer housing to vent hot gases from the ignited main ignition charge so as to begin combustion of the propellant grain.

7. The igniter of claim 6 in which said combustion modifying fluid is selected from a group of combustion inhibiting fluids consisting of ethylene glycol, silicone oil, water, carbon dioxide, dry powdered combustion suppressors, Halon 1011, and Halon 1211.

* * * * *